United States Patent
Lu et al.

(10) Patent No.: US 9,332,264 B2
(45) Date of Patent: May 3, 2016

(54) CONFIGURABLE PERFORMANCE MOTION ESTIMATION FOR VIDEO ENCODING

(75) Inventors: Ning Lu, Folsom, CA (US); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1666 days.

(21) Appl. No.: 11/967,228

(22) Filed: Dec. 30, 2007

(65) Prior Publication Data

US 2009/0168883 A1    Jul. 2, 2009

(51) Int. Cl.
| | |
|---|---|
| *H04N 19/127* | (2014.01) |
| *H04N 19/139* | (2014.01) |
| *H04N 19/159* | (2014.01) |
| *H04N 19/176* | (2014.01) |
| *H04N 19/51* | (2014.01) |
| *H04N 19/132* | (2014.01) |
| *H04N 19/154* | (2014.01) |
| *H04N 19/43* | (2014.01) |
| *H04N 19/557* | (2014.01) |

(52) U.S. Cl.
CPC ........... *H04N 19/127* (2014.11); *H04N 19/132* (2014.11); *H04N 19/139* (2014.11); *H04N 19/154* (2014.11); *H04N 19/159* (2014.11); *H04N 19/176* (2014.11); *H04N 19/43* (2014.11); *H04N 19/51* (2014.11); *H04N 19/557* (2014.11)

(58) Field of Classification Search
CPC ..... H04N 19/43; H04N 19/51; H04N 19/127; H04N 19/132; H04N 19/139; H04N 19/154; H04N 19/159; H04N 19/176; H04N 19/557

USPC ........................ 375/240.15, 240.16
See application file for complete search history.

(56) References Cited

U.S. PATENT DOCUMENTS

| | | | | |
|---|---|---|---|---|
| 5,978,592 | A * | 11/1999 | Wise | 712/1 |
| 6,996,179 | B2 * | 2/2006 | Rovati et al. | 375/240.16 |
| 7,626,518 | B2 * | 12/2009 | Hussain et al. | 341/51 |
| 7,626,578 | B2 * | 12/2009 | Wilson et al. | 345/175 |
| 7,688,891 | B2 * | 3/2010 | Kondo et al. | 375/240.03 |
| 7,724,972 | B2 * | 5/2010 | Wang et al. | 382/239 |
| 7,782,952 | B2 * | 8/2010 | Huang et al. | 375/240.16 |
| 2003/0156646 | A1 * | 8/2003 | Hsu et al. | 375/240.16 |
| 2005/0094729 | A1 * | 5/2005 | Yuan et al. | 375/240.16 |
| 2006/0002474 | A1 * | 1/2006 | Au et al. | 375/240.16 |
| 2006/0222075 | A1 * | 10/2006 | Zhang et al. | 375/240.16 |
| 2007/0047651 | A1 * | 3/2007 | Kim et al. | 375/240.16 |

OTHER PUBLICATIONS

United States Patent Applicaiton, pending—not yet published, U.S. Appl. No. 11/967,227, filed Dec. 30, 2007, to Ning Lu.

* cited by examiner

*Primary Examiner* — Heather Jones
*Assistant Examiner* — Maria Vazquez Colon
(74) *Attorney, Agent, or Firm* — Trop Pruner & Hu, P.C.

(57) ABSTRACT

A motion estimation engine may be implemented to include a skip checking module, an integer search module, a macroblock partitioning module, a fractional search module, a bidirectional motion estimation refinement module, and an intra search module. The motion estimation engine may perform fractional search/bidirectional motion estimation refinement and intra search in parallel. Additionally, modules in the motion estimation engine may be partially or fully turned on or off to accommodate different motion estimation requirements. Furthermore, the motion estimation engine may implement early exit strategy to further save computation.

26 Claims, 10 Drawing Sheets

CONFIGURABLE PERFORMANCE MOTION ESTIMATION FOR VIDEO ENCODING

BACKGROUND

1. Field

This disclosure relates generally to signal processing, and more specifically but not exclusively, to digital video encoding technologies.

2. Description

Image information (such as digital video information) is often transmitted from one electronic device to another. Such information is typically encoded and/or compressed to reduce the bandwidth required for transmission and/or to decrease the time necessary for transmission. In some configurations, information about differences between a current picture and a previous picture might be transmitted and the device receiving the image information may then, for example, decode and/or decompress the information (e.g., by using the previous picture and the differences to generate the current picture) and provide the image to a viewing device.

One of the key elements of many video encoding/compression schemes is motion estimation. A video sequence consists of a series of frames. The motion estimation technique exploits the temporal redundancy between adjacent frames to achieve compression by selecting a frame as a reference and predicting subsequent frames from the reference. The process of motion estimation based video compression is also known as inter-frame coding. Motion estimation is used with an assumption that the objects in the scene have only translational motion. This assumption holds as long as there is no camera pan, zoom, changes in luminance, or rotational motion. However, for scene changes, inter-frame coding does not work well, because the temporal correlation between frames from different scenes is low. In this case, a second compression technique—intra-frame coding—is used.

Using the motion estimation technique, the current frame in a sequence of frames is predicted from at least one reference frame. The current frame is divided into N×N pixel macroblocks, typically 16×16 pixels in size. Each macroblock is compared to a region in the reference frame of the same size using some error measure, and the best matching region is selected. The search is conducted over a predetermined search area. A motion vector denoting the displacement of the region in the reference frame with respect to the macroblock in the current frame is determined. When a previous frame is used as a reference, the prediction is referred to as forward prediction. If the reference frame is a future frame, then the prediction is referred to as backward prediction. When both backward and forward predictions are used, the prediction is referred to as bidirectional prediction.

To reduce computational overhead of macroblock search, a search window within the reference frame is often identified and the macroblock is compared to various positions within the search window. The most effective yet computationally intensive way of comparing the macroblock to the search window is to compare the pixels of the macroblock to the pixels of the search window at every position that the macroblock may be moved to within the search window. This is referred to as a "full" or "exhaustive" search. For each position of the block tested within the search window, each pixel of the block is compared to a corresponding pixel in the search window. The comparison comprises computing a deviation between the values of compared pixels.

Often the mathematical sum of absolute differences (SAD), mean squared error (MSE), mean absolute error (MSE), or mean absolute difference (MAD) functions are utilized to quantitatively compare the pixels. The deviations for each macroblock position are then accumulated, and the position within the search window that yields the smallest deviation is selected as the most likely position of the block in the previous frame. The differences in the current and previous positions of the block are then utilized to derive the motion vector to estimate the movement associated with the block between the reference frame and the current frame. The motion vector may then, for example, be transmitted as image information (e.g., instead of a full image frame) so that a decoder may render, recreate, or build the current frame by simply applying the motion vector information to the reference frame.

There are various video encoding standards. The most common ones are the Moving Pictures Expert Group (MPEG) Release Two (MPEG-2) standard published by the International Standards Organization (ISO) and the International Electrotechnical Commission (IEC), the MPEG-4 part 10 standard (also known as Advanced Video Coding (AVC) standard) published by ISO/IEC, and the Society of Motion Picture and Television Engineers or SMPTE 421 M Video Codec standard (also known as VC-1 standard). Although different standards share similar algorithmic ideas and require similar motion estimation mechanisms, the actual details are often very distinctive. Motion estimation in general requires intensive computation and is desirably performed by hardware. Since motion estimation used by different video encoding standards has its own distinctive features, each hardware implementation of motion estimation needs to be standard specific resulting in inefficient use of the hardware. Therefore, it is desirable to have a unified motion estimation hardware device which covers special constraints of various video standards.

BRIEF DESCRIPTION OF THE DRAWINGS

The features and advantages of the disclosed subject matter will become apparent from the following detailed description of the subject matter in which.

DETAILED DESCRIPTION

According to embodiments of the subject matter disclosed in this application, a motion estimation engine may be implemented to include a skip checking module, an integer search module, a macroblock partitioning module, a fractional search module, a bidirectional motion estimation refinement module, and an intra search module. The motion estimation engine may support either single or dual or both reference frames. The motion estimation engine may perform fractional search/bidirectional motion estimation refinement and intra search in parallel. Additionally, modules in the motion estimation engine may be partially or fully turned on or off to accommodate different motion estimation requirements. Furthermore, the motion estimation engine may implement early exit strategy to further save computation.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
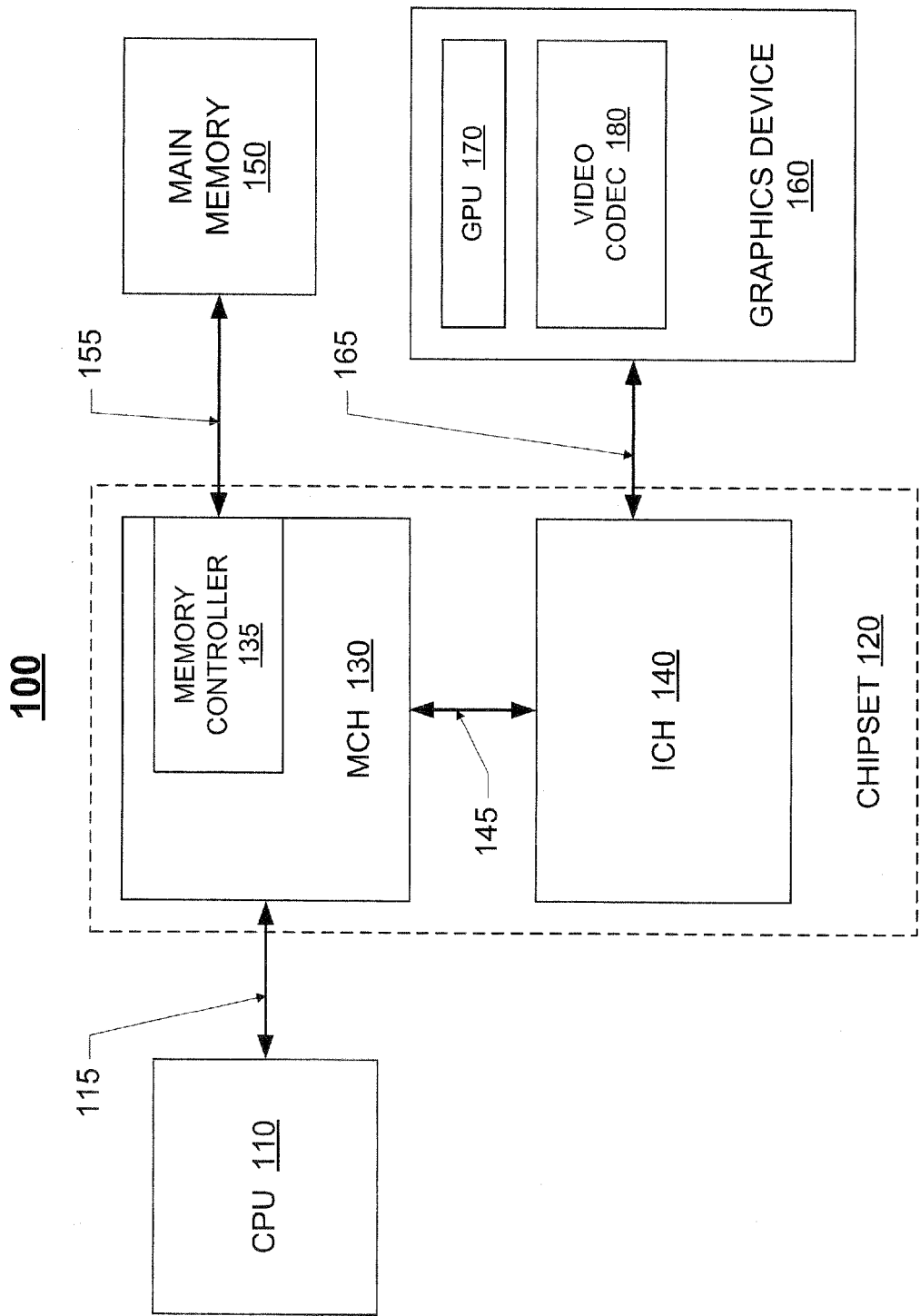
FIG. 1 shows one example computing system which may include a video encoder to compress video information using a motion estimation engine.

FIG. 1 shows one example computing system 100 which may include a video encoder to compress video information using a motion estimation engine. Computing system 100 may comprise one or more processors 110 coupled to a system interconnect 115. Processor 110 may have multiple or many processing cores (for the convenience of description, terms "core" and "processor" may be used interchangeably hereinafter and also the term "multiple cores/processors" will be used to include both multiple processing cores and many processing cores hereinafter). The computing system 100 may also include a chipset 120 coupled to the system interconnect 115. Chipset 120 may include one or more integrated circuit packages or chips.

Additionally, chipset 120 may comprise a Memory Control Hub (MCH) 130 that is coupled to a main memory 150 through a memory bus 155. The main memory 150 may store data and sequences of instructions that are executed by multiple cores of the processor 110 or any other device included in the system. The MCH 130 includes a memory controller 135 to access the main memory 150 in response to memory transactions associated with multiple cores of the processor 110, and other devices in the computing system 100. In one embodiment, memory controller 135 may be located in processor 110 or some other circuitries. The main memory 150 may comprise various memory devices that provide addressable storage locations which the memory controller 125 may read data from and/or write data to. The main memory 150 may comprise one or more different types of memory devices such as Dynamic Random Access Memory (DRAM) devices, Synchronous DRAM (SDRAM) devices, Double Data Rate (DDR) SDRAM devices, or other memory devices.

Chipset 120 may comprise an Input/Output Control Hub (ICH) 140 to support data transfers to and/or from other components of the computing system 100 such as, for example, keyboards, mice, network interfaces, etc. The ICH 140 may be coupled with other components through a bus such as bus 165. The bus may be a Peripheral Component Interconnect (PCI), accelerated graphics port (AGP), universal serial interconnect (USB), low pin count (LPC) interconnect, or any other kind of I/O interconnect. The ICH 140 (or the MCH 130) may be coupled to a graphics device 160, which generates and outputs images to a display. The graphics device may also provide an interface between the ICH 140 (or MCH 130) and other graphics/video devices. The graphics device includes a graphics processing unit (GPU) 170, which is dedicated graphics rendering device to efficiently manipulate and display computer graphics. The GPU 170 may implement a number of graphics primitive operations to process and render graphics.

Additionally, the graphics device 160 may include a video codec 180 to enable video encoding/compression and/or decoding/decompression for digital video. The video codec 180 may further include a motion estimation engine (not shown in the figure) to perform motion estimation for video compression/encoding under multiple video encoding standards such as MPEG-2, VC-1, and AVC standards. The motion estimation engine may be a part of the video codec 180, or may be a part of the GPU 170, or may be a separate engine in the graphics device 160, or may be in a different device. In one embodiment, graphics device 160 may be located in MCH 130. In another embodiment, graphics device 160 may be located in processor 110 or some other circuitries.

Figure 2:
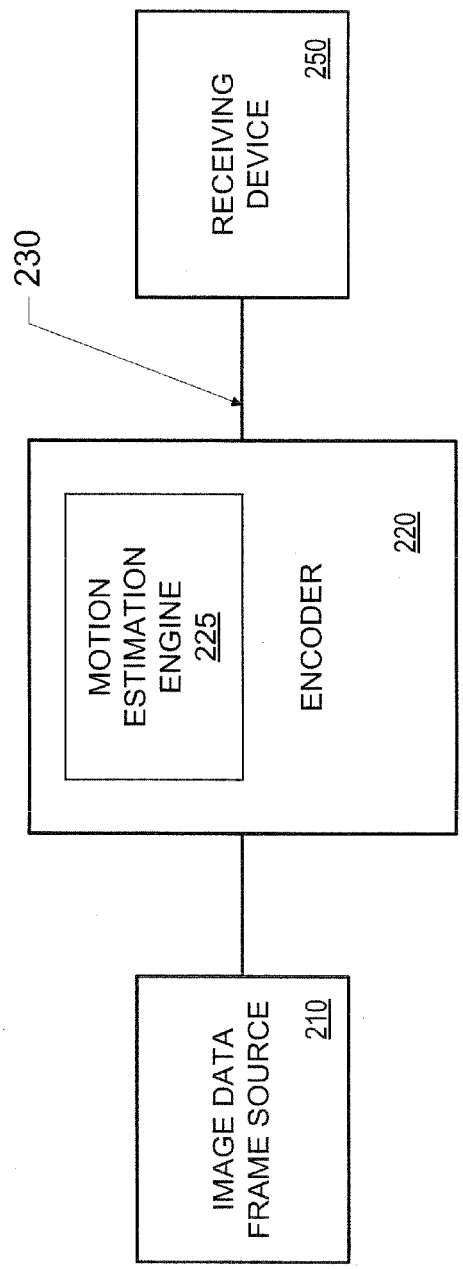
FIG. 2 shows a block diagram of a video encoder which uses a motion estimation engine to compress video information.

FIG. 2 shows a block diagram of a video encoder which uses a motion estimation engine to compress digital video under multiple video encoding standards, according to an embodiment of the subject matter disclosed in the present application. An image data frame source 210 may be coupled to provide image data frames to an encoder 220. The encoder 220 may, according to some configurations, apply an encoding and/or compression algorithm in accordance with a video encoding standard such as the MPEG-2, VC-1, or AVC standards. The encoder 220 may include a motion estimation engine 225 to obtain motion vectors so that during the decoding/decompression process an image frame may be reconstructed based on a motion vector and a reference frame used to obtain the motion vector.

The motion estimation engine 225 may be designed in such a way that it may perform motion estimation for multiple video encoding standards. There are typically three picture types commonly allowed in most video standards for video encoding/compression: the frame type, the field type, and the field-frame mixed type. The frame type is used for coding progressive contents and all macroblocks and reference pictures are considered as continuous pieces of a video picture. The field type is used mostly for coding interlaced contents and an encoder basically treats a picture as two disjoint field pictures. All macroblocks and reference pictures used in motion estimation are identical under either the field type or the frame type. Thus, assuming each picture in a digital video is stored in a memory buffer in frame format, special design for reading the picture (e.g., boundary padding) is needed for the field type. Once a picture is loaded in the motion estimation engine, it works in the same way for either the field type or the frame type. The field-frame type is used when interlaced contents are coded in frames. Depending on a video standard, there may be two subtypes for the field-frame type. One is a frame type macroblock that allows field type partitioning as under the MPEG-2 and VC-1 standards. The other is a 16×32 tall macroblock pair that can be divided into either two frame macroblocks or two field macroblocks as under the AVC standard.

Depending on the picture type of a digital video to be encoded/compressed under different video standards, the motion estimation engine 225 may apply a corresponding distortion calculation mode. For example, for frame type digital video signals (e.g., video signals using the AVC standard), distortion measures for macroblock search may be calculated for a total of 41 macroblock partitions on the basis of 4×4 sub-block units; and for field type and field-frame type digital video signals (e.g., video signals using the VC-1 or MPEG-2 standard), distortion measures for macroblock search may be calculated for a total of 15 macroblock partitions. Additionally, the motion estimation engine 225 may provide the mixing unidirectional option (forward/backward) and the mixing bidirectional option for video signals obtained using different video standards. Furthermore, the motion estimation engine 225 may use a unified 4-tap interpolation filter for fractional macroblock search during motion estimation.

The motion estimation engine 225 may generate motion vectors for corresponding reference frames. The encoder 220 may use the motion vectors and their corresponding reference frames to further compress video signals. The encoded/compressed video signals from the encoder 220 may be stored in a storage device and/or may be transmitted through a channel 230 to a receiving device 250. The channel 230 may be a wired or wireless channel. The receiving device 250 may decode/decompress the received encoded/compressed video signals and reconstruct original video signals based on reference frames and motion vectors.

Figure 3:
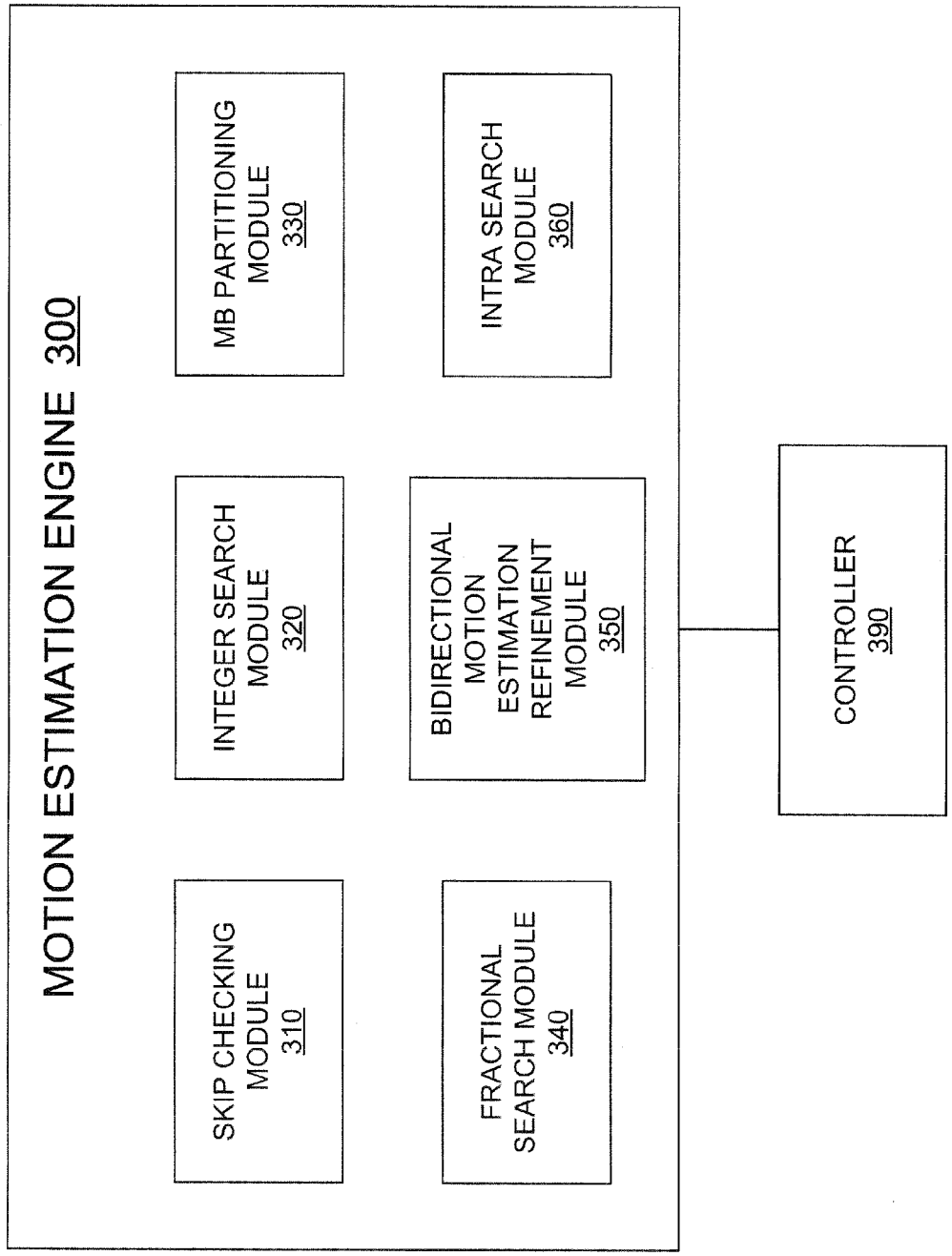
FIG. 3 shows a block diagram of a motion estimation engine used by a video encoder to compress video information for multiple video encoding standards.

FIG. 3 shows a block diagram of a motion estimation engine 300 used by a video encoder to encode/compress video signals under multiple video encoding standards, according to an embodiment of the subject matter disclosed in the present application. Motion estimation engine 300 comprises a skip checking module 310, an integer search module 320, a macroblock (MB) partitioning module 330, a fractional search module 340, a bidirectional checking module 350, and an intra search module 360. The motion estimation engine 300 may work with a controller 390 which controls/coordinates operations of different modules in the motion estimation engine 300. In one embodiment, there might not be a separate controller, but a GPU (e.g., GPU 170 in FIG. 1) in a graphics device may be used to control operations of each module in the motion estimation engine 300 and/or coordinate operations among the modules in the motion estimation engine 300. In another embodiment, controller 390 may be integrated with and become a part of the motion estimation engine 300. In one embodiment, the motion estimation engine 300 may have a buffer (not shown in the figure) associated with it to temporarily store macroblocks read from a storage device that stores frame(s) of digital video to be encoded/compressed. Controller 390 may feed to the motion estimation engine one macroblock at a time.

For most video codec standard, all macroblocks have default predicted codes: some motion vectors derived from their already-coded-neighborhood macroblock codes—e.g. left, top, top-left, top-right, and same location from previously coded frames. Following the same principle, the detailed description varies from standard to standard. As long as it is agreed by both encoder and decoder, no actual codes will be carried in the data stream except a coded flag bit to indicate the choice. Such coded macroblocks are called of skip type. Since the skip type is the most efficient type to code a macroblock, the distortion of using skip type is checked by the skip checking module 310 often as the first type to be checked. If the distortion is low, this skip code may be selected without going through the rest of the motion estimation to try other code types.

If the received macroblock needs to go through the process of motion estimation, it may be passed to the integer search module 320. The integer search module 320 may search the reference frame for the received macroblock at pixels with integer indices. The integer search module 320 may calculate search distortion based on 4×4 subblock units. For example, if the received macroblock is 16×16 pixels, the integer search module 320 may partition the macroblock into four 4×4 subblocks and calculate a distortion for each 4×4 subblock. The distortion for the 16×16 macroblock may be obtained by adding together distortions of the four 4×4 subblocks. Using a 4×4 subblock as a unit for distortion calculations provides flexibility for multiple ways of partitioning a macroblock because many macroblock partitions may be obtained by a combination of one or more 4×4 subblocks. It also provides flexibility for macroblocks with different dimensions (e.g., 8×8, 8×16, and 16×8 macroblocks may all be partitioned into multiple 4×4 subblocks). The integer search module 320 may store distortions for all 4×4 subblocks as well as for the entire macroblock in a buffer associated with the motion estimation engine 300.

Figure 5A:
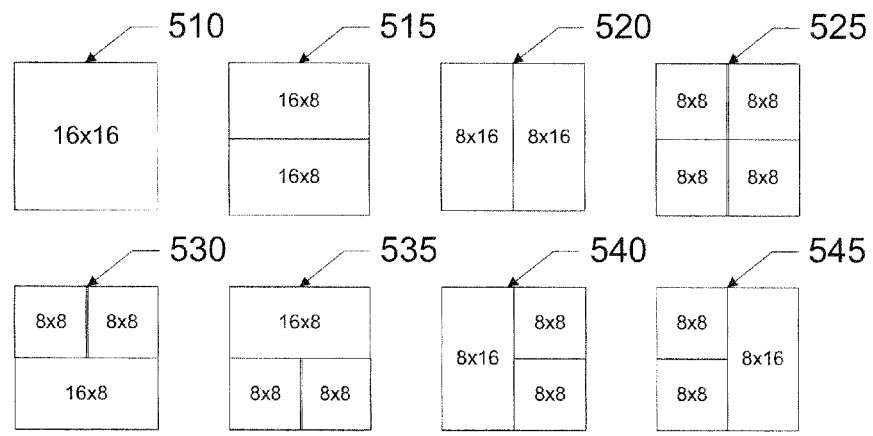
FIGS. 5A and 5B illustrate ways to partition a macroblock during motion estimation.
Figure 5B:
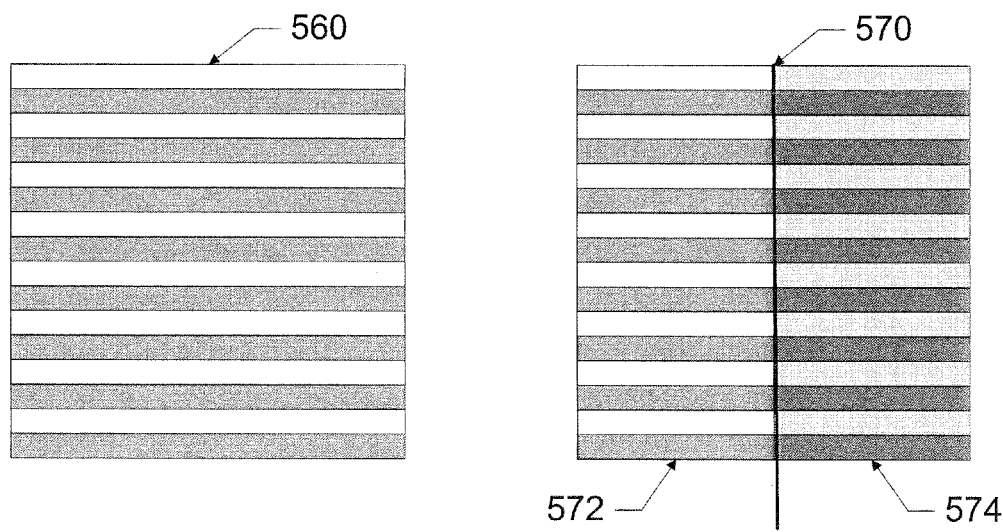

The MB partitioning module 330 may support multiple ways of macroblock partitioning for either the frame type, or the field type, or the field-frame type digital video signal. A macroblock partitioning may be referred to as a major partition if no sub-block is smaller than 8×8, and may be referred to as a minor partition if no sub-block is larger than 8×8. In reality, few standards currently support macroblock partitioning that mixes blocks larger than 8×8 (such as 16×8 or 8×16) with blocks smaller than 8×8 (such as 8×4, 4×8, and 4×4). As shown in FIG. 5A, there are 8 possible major macroblock frame type partitions (partition 510, 515, 520, 525, 530, 535, 540, and 545) for a 16×16 macroblock. The total number of possible minor partitions can be very large (e.g., several thousands for a 16×16 macroblock). Embodiments of the subject matter disclosed in the present application may support some or all of such major partitions and a portion of minor partitions. For example, the AVC standard allows minor partitions but limited to ones whose each 8×8 sub-region is divided into the same shapes (i.e. one 8×8, two 8×4s, two 4×8s, or four 4×4s.). In one embodiment, all of such minor partitions allowed by the AVC standard and/or some other minor partitions may be supported. Additionally, two field partitions (i.e., partition 560 and partition 570 as shown in FIG. 5B) may be supported. Partition 560 includes two 16×8 subblocks with one subblock having all of the even rows and the other having all of the odd rows. Partition 570 includes four 8×8 blocks by partitioning the 16×16 block into two 8×16 subblocks 572 and 574 and by further partitioning each of subblocks 572 and 574 into two 8×8 subblocks with one 8×8 subblock having all of the even rows and the other having all of the odd rows.

Figure 6:
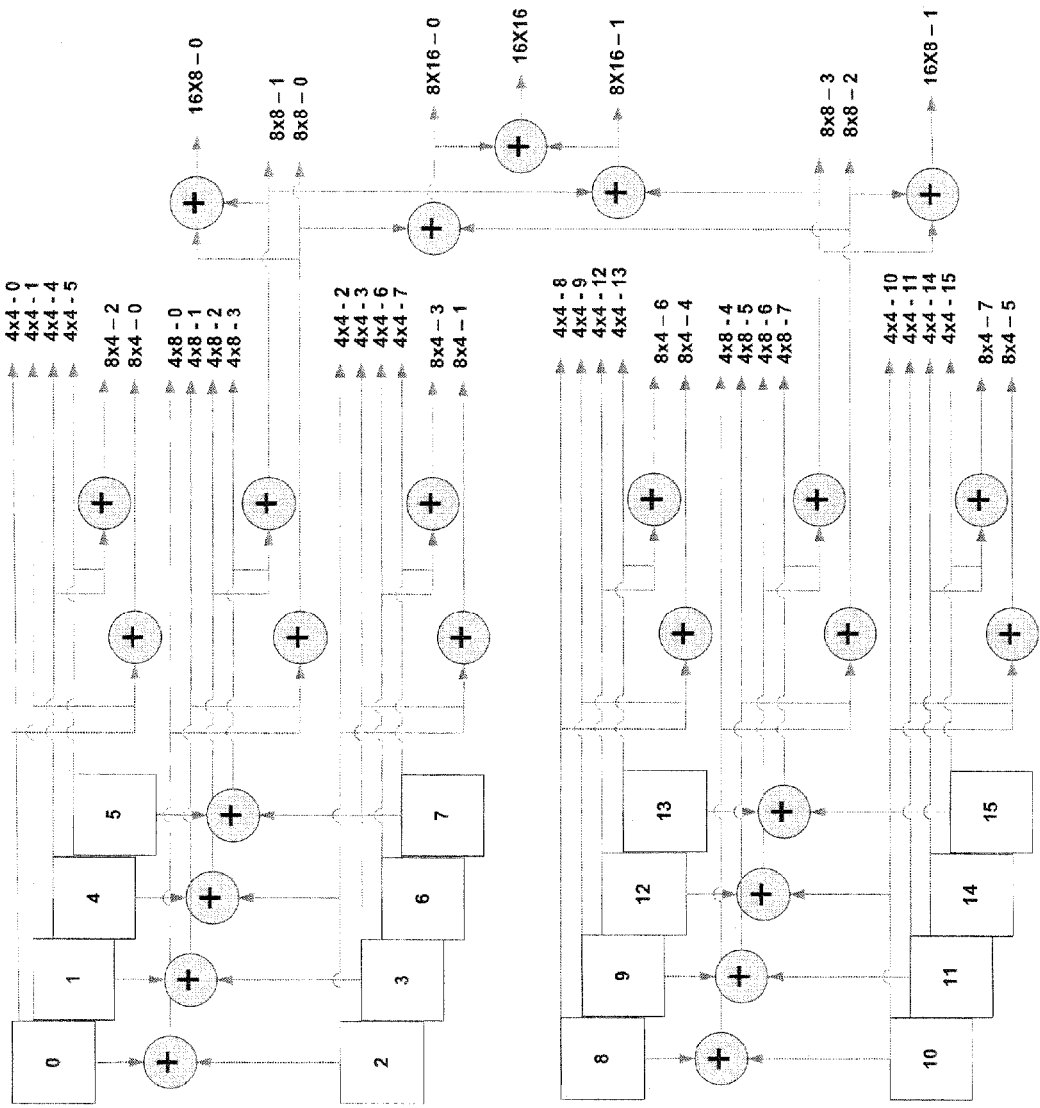
FIG. 6 illustrates an example approach to computing distortions for macroblock search during motion estimation.

In one embodiment, 41 subblocks (i.e., 1 16×16, 2 16×8's, 2 8×16's, 4 8×8's, 8 8×4's, 8 4×8's, and 16 4×4's) may be supported in a first mode for frame type video signals or field type video signals when both fields are coded as separated pictures or macroblocks (e.g., video signals under the AVC standard does allow sub-block partitioning as fine as to 4×4 block size); and 15 subblocks (i.e., 1 16×16, 2 16×8's, 2 8×16's, 4 8×8's, 2 field 16×8's, and 4 field 8×8's) may be supported in a second mode for mixed field-frame type video signals (e.g., video signals of a macroblock is allowed to be coded in either frame type or field type individually under the VC-1 and/or MPEG-2 standard). In the first mode, distortions for all basic 4×4 subblocks are calculated and distortions for all the other subblocks are obtained from distortions of basic 4×4 subblocks as illustrated in are not calculated for each sub-block but to the common 4×4 sub-blocks, and all the other ones are added afterwards as illustrated in FIG. 6 and by the following pseudo-codes:

```
b4[16] = {   {0,0},{4,0},{0, 4},{4, 4}, {8,0},{12,0},{8, 4},{12, 4},
             {0,8},{4,8},{0,12},{4,12}, {8,8},{12,8},{8,12},{12,12} };
Dist4x4[i]=distortion for block start at p=&Mb[b4[i].y][b4[i].x] of pixels:
           p[0][0],p[0][1],p[0][2],p[0][3],p[1][0],...,p[3][3]; for i=0,1,...,15.
Dist8x4[j]=Dist4x4[j*2 ]+Dist4x4[j*2+1]; for j = 0,1,2,3,4,5,6,7.
Dist4x8[j]=Dist4x4[j*2 ]+Dist4x4[j*2+2]; for j = 0,2,4,6.
Dist4x8[j]=Dist4x4[j*2−1]+Dist4x4[j*2+1]; for j = 1,3,5,7.
Dist8x8[k]=Dist8x4[k*2 ]+Dist8x4[k*2+1]; for k = 0,1,2,3.
```

-continued

```
Dist8x16[0]=Dist8x8[0]+Dist8x8[2]; Dist8x16[1]=Dist8x8[1]+Dist8x8[3];
Dist16x8[0]=Dist8x8[0]+Dist8x8[1]; Dist16x8[1]=Dist8x8[2]+Dist8x8[3];
Dist16x16[0]=Dist16x8[0]+Dist16x8[1].
```

Figure 7:
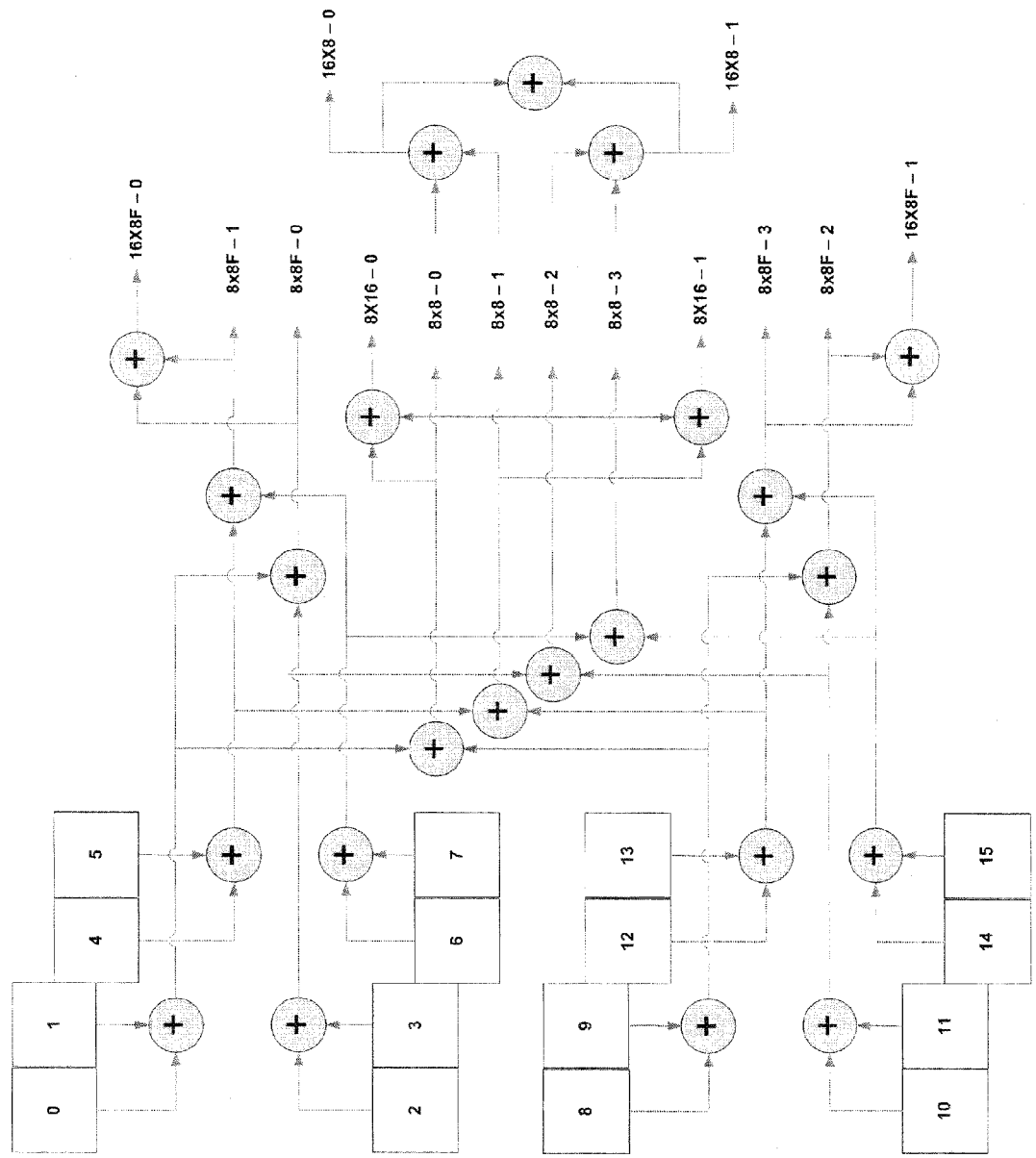
FIG. 7 illustrates another example approach to computing distortions for macroblock search during motion estimation.

In the second mode, a similar strategy for obtaining distortions for all of the 15 subblocks may be taken. In this mode, basic subblocks may be 4×4 field sub-blocks and distortions for all of such basic subblocks may be calculated, and distortions for all the other sub-blocks may be derived from distortions of those basic subblocks, as illustrated in FIG. 7 and by the following pseudo-codes:

```
b4[16] = {  {0,0},{4,0},{0,8},{4,8}, {8,0},{12,0},{8,8},{12,8},
            {0,1},{4,1},{0,9},{4,9}, {8,1},{12,1},{8,9},{12,9} };
Dist4x4F[i]=distortion for block start at p=&Mb[b4[i].y][b4[i].x] of pixels:
       p[0][0],p[0][1],p[0][2],p[0][3],p[2][0],...,p[6][3]; for i=0,1,...,15.
Dist8x8[0]=Dist4x4F[0]+Dist4x4F[1]+Dist4x4F[ 8]+Dist4x4F[ 9];
Dist8x8[1]=Dist4x4F[4]+Dist4x4F[5]+Dist4x4F[12]+Dist4x4F[13];
Dist8x8[2]=Dist4x4F[2]+Dist4x4F[3]+Dist4x4F[10]+Dist4x4F[11];
Dist8x8[3]=Dist4x4F[6]+Dist4x4F[7]+Dist4x4F[14]+Dist4x4F[15];
Dist8x8F[0]=Dist4x4F[ 0]+Dist4x4F[ 1]+Dist4x4F[ 2]+Dist4x4F[ 3];
Dist8x8F[1]=Dist4x4F[ 4]+Dist4x4F[ 5]+Dist4x4F[ 6]+Dist4x4F[ 7];
Dist8x8F[2]=Dist4x4F[ 8]+Dist4x4F[ 9]+Dist4x4F[10]+Dist4x4F[11];
Dist8x8F[3]=Dist4x4F[12]+Dist4x4F[13]+Dist4x4F[14]+Dist4x4F[15];
Dist8x16[0]=Dist8x8[0]+Dist8x8[2]; Dist8x16[1]=Dist8x8[1]+Dist8x8[3];
Dist16x8[0]=Dist8x8[0]+Dist8x8[1]; Dist16x8[1]=Dist8x8[2]+Dist8x8[3];
Dist16x8F[0]=Dist8x8F[0]+Dist8x8F[1];
Dist16x8F[1]=Dist8x8F[2]+Dist8x8F[3];
Dist16x16[0]=Dist16x8[0]+Dist16x8[1].
```

With 41 subblocks supported in the first mode, many macroblock partitions may be supported. Similarly with 15 sub-blocks supported in the second mode, a number of macroblock partitions may be supported. The motion estimation engine 300 may be switched among all of the supported partitions according to different standard specifications. Normally, if any field shape is on, the motion estimation engine is set to the second mode; otherwise, the motion estimation engine is in the first mode.

Distortions for all specified subblocks in either the first or the second mode may be calculated during integer search by the integer search module 320. Comparisons are made and the best (with the least distortion) is recorded for each sub-block.

The MB partitioning module 330 further obtains distortions for each possible macroblock partition allowed by the video standard under which the video signal to be encoded/compressed is obtained, based on the best-recorded subblock distortions so obtained as described above. The MB partitioning module 330 may then compare distortions of all the available macroblock partitions and select the one that has the least overall distortion for macroblock partition.

The fractional search module 340 may search a macroblock at fractional pixel locations. Typically half-pel and quarter-pel pixel values are used for fractional macroblock search. Half-pel or quarter-pel pixel values are obtained using interpolation formulas. For instance, the AVC standard uses 6-tap formulas below:

$$\text{For ½-pel: } (1,-5,20,20,-5,1)/32; \tag{1}$$

$$\text{For ¼-pel: } (1,-5,52,20,-5,1)/64. \tag{2}$$

The VC-1 standard uses 4-tap filters as defined below:

$$\text{For ½-pel: } (-1,9,9,-1)/16; \tag{3}$$

$$\text{For ¼-pel: } (-4,53,18,-3)/64. \tag{4}$$

In general, bilinear interpolation is also accepted too (as used by the MPEG2 standard):

$$\text{For ½-pel: } (0,1,1,0)/2; \tag{5}$$

$$\text{For ¼-pel: } (0,3,1,0)/4. \tag{6}$$

In one embodiment, the fractional search module may use different formulas according to different video standards. In another embodiment, a unified 4-tap interpolation may be used for all of the different video standards, as shown below:

$$\text{For ½-pel: } (-1,5,5,-1)/8; \tag{7}$$

$$\text{For ¼-pel: } (-1,13,5,-1)/16. \tag{8}$$

Figure 9A:
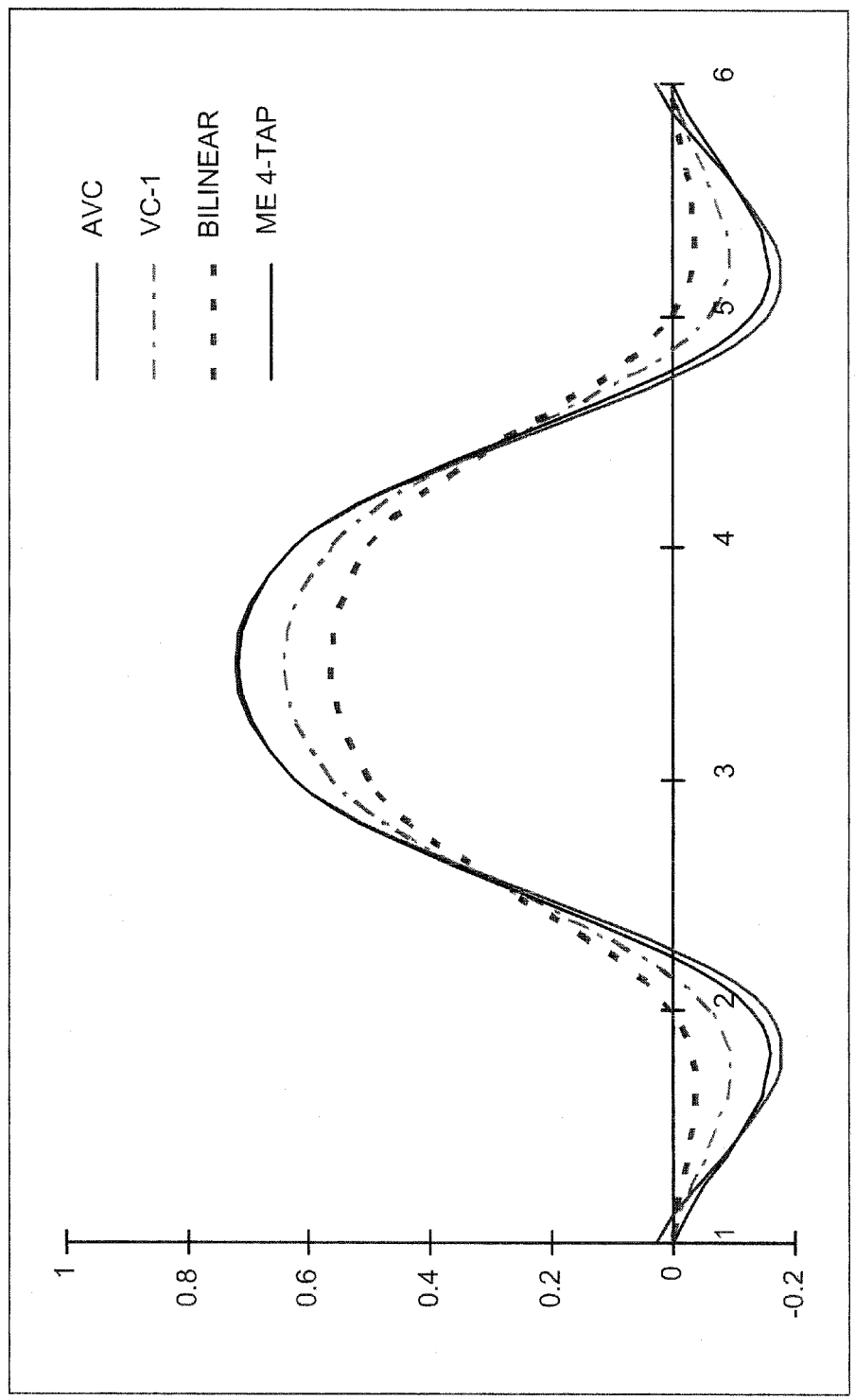
FIGS. 9A and 9B illustrate fractional motion estimation interpolation schemes.
Figure 9B:
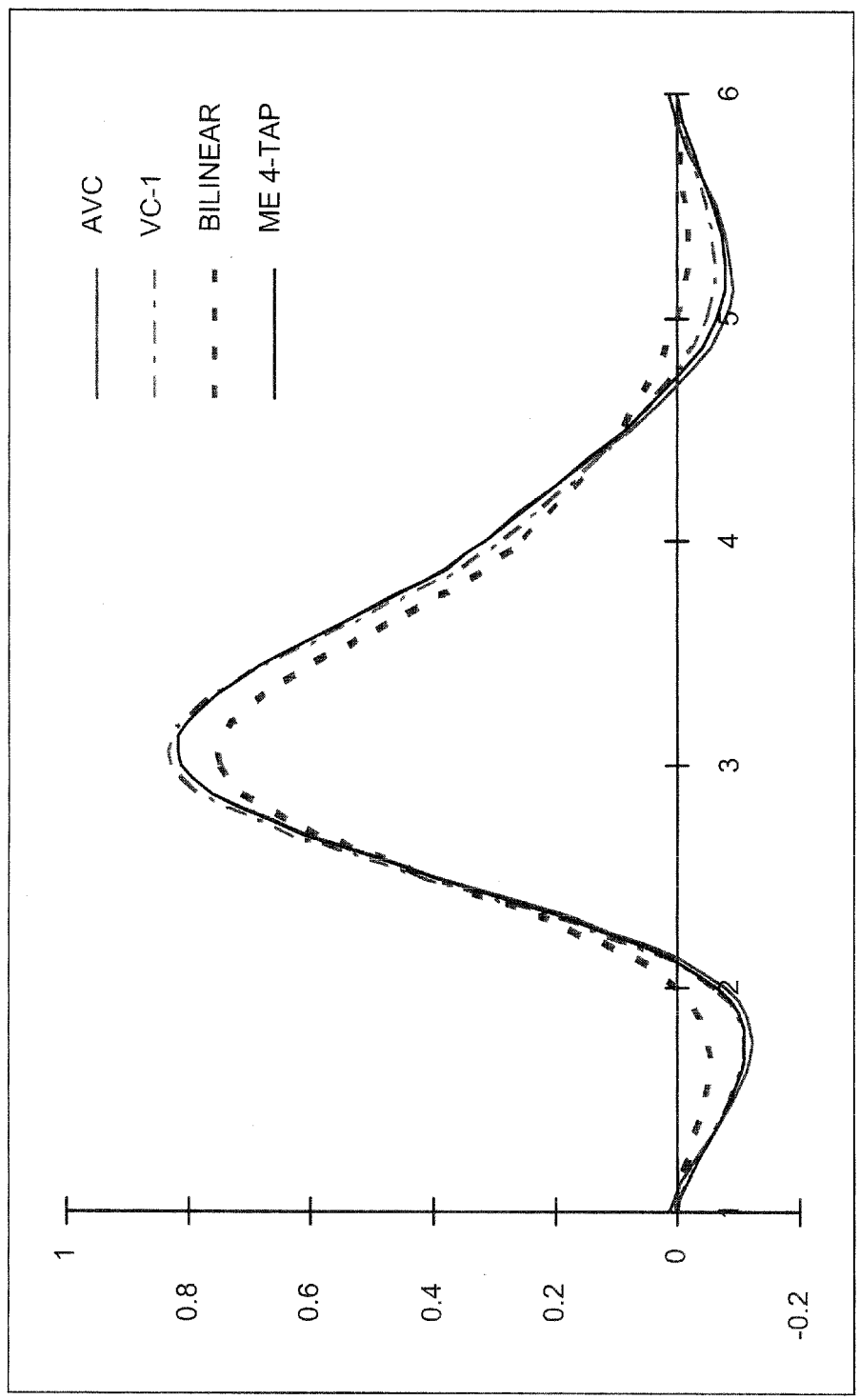

As shown in FIG. 9A (for half-pel) and FIG. 9B (for quarter-pel), the unified 4-tap interpolation formulas shown in Equations (7) and (8) are good approximations of the formulas used by various video standards.

The bidirectional motion estimation refinement module 350 may refine prediction directions on the sub-block level or the macroblock level. Given a macroblock partition pattern, some standards allow different sub-blocks to have their own decision on whether the prediction should be unidirectional or bidirectional, and whether the prediction should be forward or backward; while others make such decisions in the macroblock level as whole. Typically, there are three scenarios:

1). Each sub-block has its own decision on whether the prediction should be unidirectional or bidirectional, and whether the prediction should be forward or backward (e.g., the AVC standard). In this case, directions are chosen for each subblock and the macroblock partitioning may be updated after direction refinement for each subblock.

2). All of the sub-blocks share the same directions, whether unidirectional or bidirectional and whether forward or backward (e.g., the MPEG-2 standard). In this case, the partitioning is done for each individual direction first, and the better one is chosen later.

3). All of the sub-blocks must be all unidirectional or bidirectional. If it is unidirectional, each sub-block can decide whether is forward or backward (e.g., the VC-1 standard). In this case, forward and backward decision for each sub-block is done first, then partitioning for unidirectional is performed. Bidirectional is checked for the unidirectional best, and it is chosen only if it is better.

Figure 8:
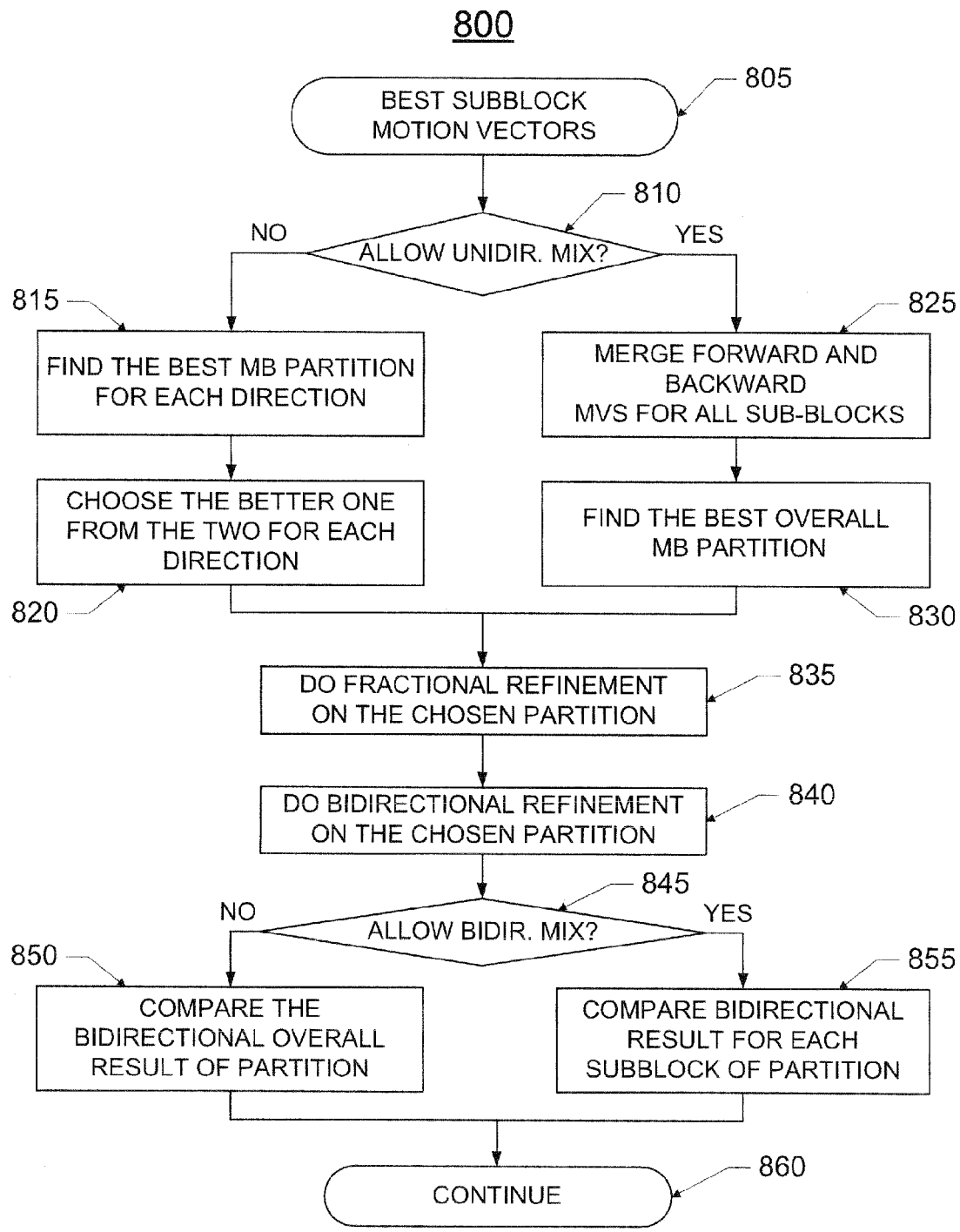
FIG. 8 is a flowchart of an example process for refining prediction directions during motion estimation.

In one embodiment, the bidirectional motion estimation refinement module 350 may be designed to accommodate all of the above cases. FIG. 8 is a flowchart of an example process 800 which the bidirectional motion estimation refinement module may use to refine motion estimation. Process 800 starts with the best subblock motion vectors at block 805, i.e., the bidirectional motion estimation refinement module 350 works on the basis of the best macroblock partitioning determined before the bidirectional refinement starts. At block 810, the bidirectional motion estimation refinement module 350 determines whether the video standard under which the video signal is obtained allows each subblock to have its own decision on whether the prediction should be forward or backward. If the answer is "no," at block 815 the best macroblock partition may be found for each direction; and at block 820 between the two macroblock partitions (one for each direction), the one with smaller distortion may be chosen. If the answer is "yes," at block 825, forward and backward motion vectors for all subblocks may be merged at block 825; and at block 830, the best overall macroblock partition may be obtained based on the merged motion vectors. At block 835, fractional refinement (fractional search) may be performed on the chosen partition. At block 840, bidirectional refinement may be performed on the chosen partition. At block 845, the bidirectional motion estimation refinement module 350 may determine whether the video standard allows each subblock to have its own decision on whether the prediction should be unidirectional or bidirectional. If the answer is "no," the final direction pattern may be chosen by comparing bidirectional overall results of the partition chosen at block 840 with all subblocks being unidirectional and being bidirectional at block 850. If the answer is "yes," the final direction pattern may be chosen by comparing bidirectional results for each subblock of the partition chosen at block 840. At block 860, the process 800 may continue for another macroblock.

The intra search module 360 may perform intra-frame search for the received macroblock. The intra-frame search works better when there are scene changes from frame to frame or when there is no motion vector set found with small enough distortion. In one embodiment, the intra search module 360 may perform intra-frame search in parallel with the inter-frame search.

Additionally, the motion estimation engine 300 may support early exits. In any stage of the encoding, the motion estimation engine may terminate the estimation process if some "good enough" pattern of the macroblock is found in the reference frame. A "good enough" pattern in the reference frame is a block whose total adjusted distortion error from the macroblock is below a threshold constant provided by the user as part of a motion estimation command.

Moreover, the motion estimation engine 300 may support refinement skip. If the best result after integer search is "still bad", the motion estimation engine 300 may skip fractional and bidirectional searches and jump to intra-frame directly to save time and computation. A "still bad" result is a block in the reference frame whose total adjusted distortion error from the macroblock is above a threshold constant provided by the user as part of a motion estimation command.

Furthermore, the motion estimation engine 300 may support a working mode under which the engine may output all distortion values in addition to the best results of all major partitions to allow user to be able to use the motion estimation for non-encoding applications and further refinement of encoding solutions.

Figure 4:
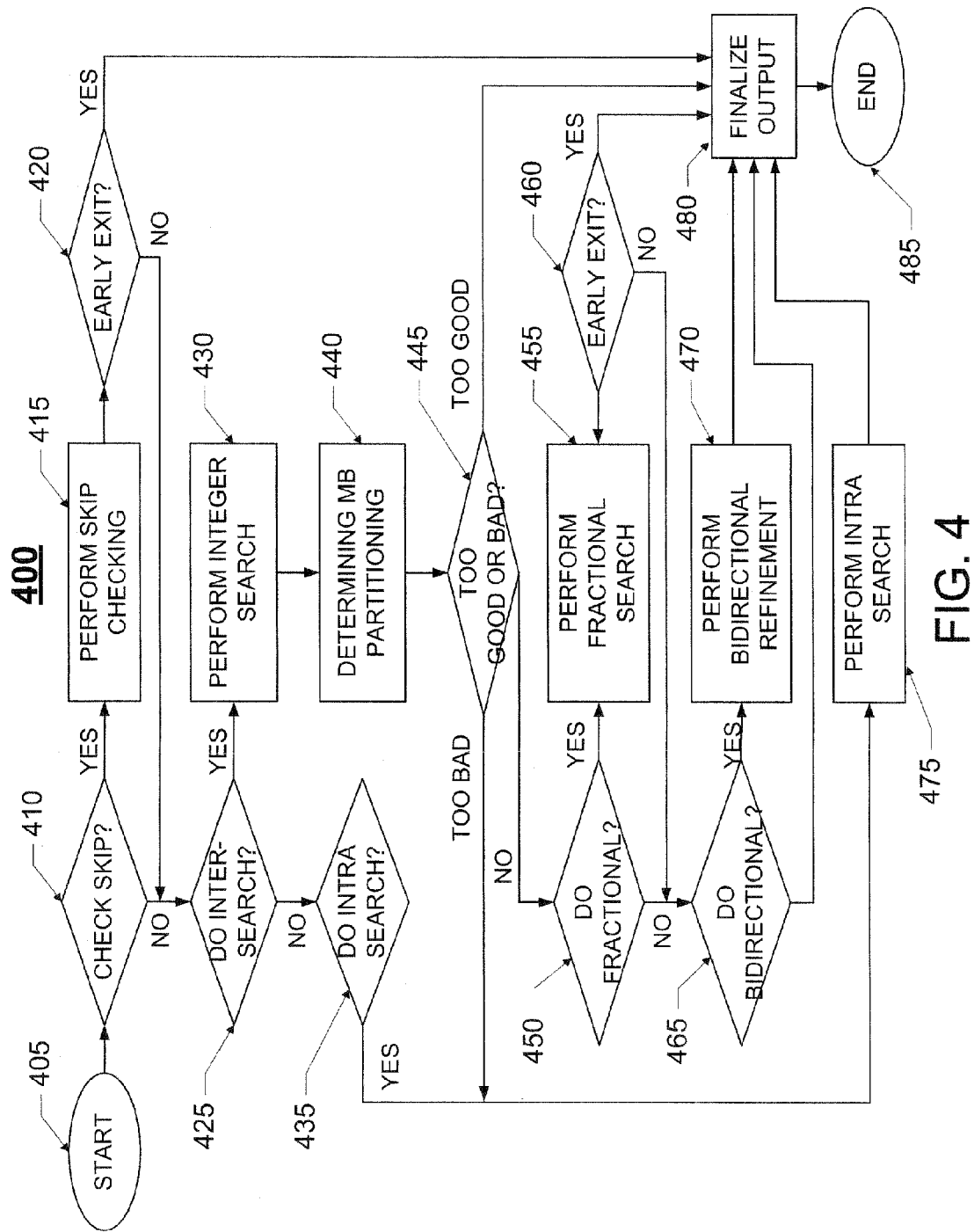
FIG. 4 is a flowchart of one example process for a motion estimation engine to perform motion estimation for multiple video encoding standards.

FIG. 4 is a flowchart of one example process 400 for a motion estimation engine to perform motion estimation for multiple video encoding standards, according to an embodiment of the subject matter disclosed in the present application. Process 400 starts at block 405. At block 410, the motion estimation engine (e.g., 300 in FIG. 3) may receive a macroblock from the current frame and check whether the "P-skip" is enabled for the macroblock. If it is, the motion estimation engine may perform skip checking at block 415. If it is determined that the macroblock may indeed be skipped from motion estimation at block 420, process 800 may directly jump to block 480. If the "P-skip" is found at block 410 not enabled or if it is determined that the macroblock may not be skipped from motion estimation at block 420, the motion estimation engine may check whether inter-frame search is needed for the macroblock at block 425. A bit in an information bit vector for the macroblock and/or for the current frame may be set to indicate that inter-frame search is needed. If the inter-frame search is needed, the motion estimation engine may perform integer search (described above for integer search module 320) at block 430. If the inter-frame search is not needed, it may be further determined whether intra-frame search is needed for the macroblock at block 435. If the answer is "yes," process 800 will proceed to block 475 directly.

During the integer search at block 430, the motion estimation engine will determine whether a search result is good enough so that the search may be exited to proceed to block 440. A search result is good enough if the distortion between the search result and the macroblock is below a predetermined threshold. The threshold may be predetermined by a user and provided to the motion estimation engine via a command. As described above for FIG. 3, distortions for all of the 4×4 basic blocks of the macroblock may be computed and retained during the inter-frame search. Distortions for other shaped subblocks may be obtained from the distortions of various 4×4 basic blocks. Based on all of the distortions so derived, an optimal macroblock partition may be determined at block 440.

At block 445, it may be determined whether the overall distortion for the determined optimal macroblock partition is above a "too bad" threshold or is below a "too good" threshold. The "too bad" threshold is used to indicate that the integer search result is not acceptable and an intra-search may thus be necessary. The "too good" threshold is used to indicate that the integer search result is good enough and it is not necessary to perform further refinement to the search result. Both thresholds are predetermined by a user and provided to the motion estimation engine via a command. If the result from the integer search is too bad, process 800 may proceed directly to block 475 for intra-frame search. If the result is too good, on the other hand, process 800 may exit early and proceed directly to block 480. If the search result is between the "too bad" threshold and the "too good" threshold, process 800 may proceed to block 450 to determine whether fractional search refinement is needed.

At block 450, the bit in an information bit vector that indicates whether the fractional search is needed for the macroblock may be checked. If the fractional search bit is set, fractional search (as described above for the fractional search module 340 in FIG. 3) may be performed at block 455. If after the fractional search, it is determined at block 460 the overall distortion between the macroblock and its corresponding search results in the reference frame is below an "early exit" threshold, process 800 may proceed directly to block 480 without any further refinement to the search result. The "early exit" threshold may be set the same as the "too good" threshold, or it may be predetermined differently. The "early exit" threshold may be provided to the motion estimation engine via a command.

If it is determined at block 460 that an early exit is not warranted, process 800 may proceed to block 465 for further processing of the search results from block 455. At block 465, it may be determined whether a bidirectional refinement is needed by checking the bidirectional bit in the information bit vector. If the bidirectional bit is set, bidirectional refinement (as described above for bidirectional motion estimation refinement module 350 in FIG. 3) may be performed at block 470; otherwise, process 800 may proceed to block 480. Intra-frame search may be performed at block 475. Results from different blocks may be received by block 480, which finalize the results and output the results in a format desired by the next stage of the video encoding process.

Although an example embodiment of the disclosed subject matter is described with reference to block and flow diagrams in FIGS. 1-9, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
a skip checking module to determine whether a macroblock in a current picture frame may be skipped from motion estimation;
an integer search module to search a reference frame for the macroblock at integer pixel locations if the macroblock is not skipped from motion estimation;
a macroblock partitioning module to determine a macroblock partition based on results from the integer search module; and
a bidirectional motion estimation refinement module to determine whether a selected video encoding standard allows each subblock to have its own decision on whether prediction should be forward or backward;
if not, find the best macroblock partition in each direction and select the partition direction with smaller distortion;
if so, merge backward and forward motion vectors for all subblocks and obtain the best macroblock partition based on the merged vectors; and
determine whether the selected video encoding standard allows each subblock to have its own decision on whether prediction should be unidirectional or bidirectional;
if not, choose the final direction pattern by comparing bidirectional results for the chosen partition with all subblocks having unidirectional and being bidirectional;
if so, chose the final direction by comparing bidirectional results for the chosen partition.

2. The apparatus of claim 1, further comprising a fractional search module to fine-tune the results from the integer search module by searching the macroblock in the reference frame at fractional pixel positions, if the results from the integer search module need to be fine-tuned.

3. The apparatus of claim 1, further comprising an intra search module to conduct intra-frame search for the macroblock.

4. The apparatus of claim 1, further comprising a controller to control operations of modules in the apparatus, to coordinate among the modules in the apparatus, and to output motion estimation results to a video encoder.

5. The apparatus of claim 4, wherein the controller determines whether to skip operations of a certain module.

6. The apparatus of claim 1, wherein the integer search module exits the integer search when the integer search module determines that distortion between a block in the reference frame and the macroblock is below a predetermined threshold.

7. The apparatus of claim 1, wherein results from the macroblock partitioning module are used to form final results of motion estimation for the macroblock if distortion between the macroblock and its corresponding block in the reference frame based on the determined macroblock partition is either larger than a first threshold or smaller than a second threshold, the first threshold corresponding to a high distortion, the second threshold corresponding to a low distortion.

8. A computing system, comprising:
a memory to store information associated with a reference frame; and
a motion estimation engine to perform motion estimation for a current frame and to produce a motion vector for the current frame based on the reference frame, the motion estimation engine including:
a skip checking module to determine whether a macroblock in the current frame may be skipped from motion estimation,
an integer search module to search the reference frame for the macroblock at integer pixel locations if the macroblock is not skipped from motion estimation,
a macroblock partitioning module to determine a macroblock partition based on results from the integer search module; and
a bidirectional motion estimation refinement module to determine whether a selected video encoding standard allows each subblock to have its own decision on whether prediction should be forward or backward;
if not, find the best macroblock partition in each direction and select the partition direction with smaller distortion;
if so, merge backward and forward motion vectors for all subblocks and obtain the best macroblock partition based on the merged vectors; and
determine whether the selected video encoding standard allows each subblock to have its own decision on whether prediction should be unidirectional or bidirectional;
if not, choose the final direction pattern by comparing bidirectional results for the chosen partition with all subblocks having unidirectional and being bidirectional;
if so, chose the final direction by comparing bidirectional results for the chosen partition.

9. The computing system of claim 8, wherein the motion estimation engine further comprises a fractional search module to fine-tune the results from the integer search module by searching the macroblock in the reference frame at fractional pixel positions, if the results from the integer search module need to be fine-tuned.

10. The computing system of claim 8, wherein the motion estimation engine further comprises an intra search module to conduct intra-frame search for the macroblock.

11. The computing system of claim 8, wherein the motion estimation engine further comprises a controller to control operations of modules in the apparatus, to coordinate among the modules in the apparatus, and to output motion estimation results to a video encoder.

12. The computing system of claim 11, wherein the controller determines whether to skip operations of a certain module.

13. The computing system of claim 11, wherein functions of the controller are performed by a graphics processing unit ("GPU").

14. The computing system of claim 8, wherein the integer search module exits the integer search when the integer search module determines that distortion between a block in the reference frame and the macroblock is below a predetermined threshold.

15. The computing system of claim 8, wherein results from the macroblock partitioning module are used to form final results of motion estimation for the macroblock if distortion between the macroblock and its corresponding block in the reference frame based on the determined macroblock partition is either larger than a first threshold or smaller than a second threshold, the first threshold corresponding to a high distortion, the second threshold corresponding to a low distortion.

16. The computing system of claim 8, wherein the motion estimation engine is located on a graphics device in the computing system.

17. A method comprising:
receiving a macroblock from a current frame;
checking whether the macroblock is indicated by a flag bit to be skipped from motion estimation;
if the macroblock is indicated by the flag bit to be skipped, determining, based on a level of distortion, whether the macroblock may be skipped from motion estimation;
if the macroblock may be skipped from motion estimation, checking whether an integer search is set to be performed;
performing an integer search for the macroblock in a reference frame at integer pixel locations;
if an intra search is set to be performed, performing intra-frame search for the macroblock; determining whether a selected video encoding standard allows each subblock to have its own decision on whether prediction should be forward or backward;
if not, find the best macroblock partition in each direction and select the partition direction with smaller distortion;
if so, merge backward and forward motion vectors for all subblocks and obtain the best macroblock partition based on the merged vectors; and
determine whether the selected video encoding standard allows each subblock to have its own decision on whether prediction should be unidirectional or bidirectional;
if not, choose the final direction pattern by comparing bidirectional results for the chosen partition with all subblocks having unidirectional and being bidirectional;
if so, chose the final direction by comparing bidirectional results for the chosen partition.

18. The method of claim 17, further comprising if a distortion measure between a block in the reference frame and the macroblock is below a predetermined threshold during at least one of the integer search and the skip checking, exiting motion estimation and outputting a final result for the macroblock to a video encoder.

19. The method of claim 17, further comprising:
calculating distortions for all first dimension pixel subblocks in the macroblock during the integer search;
deriving distortions for other dimension subblocks in the macroblock; and
determining macroblock partition that results in the least distortion between the macroblock and its corresponding blocks in the reference frame.

20. The method of claim 17, further comprising fine-tuning results from the integer search by searching the macroblock in the reference frame at fractional pixel positions, if a fractional search is set to be performed.

21. The method of claim 17, further comprising refining prediction directions for the macroblock based on the macroblock partition, if a bidirectional refinement is set to be performed.

22. An article comprising a non-transitory machine-readable medium that contains instructions, which when executed by a processing platform, cause said processing platform to perform operations including:
  receiving a macroblock from a current frame;
  checking whether the macroblock is indicated by a flag bit to be skipped from motion estimation;
  if the macroblock is indicated by the flag bit to be skipped, determining, based on a level of distortion, whether the macroblock may be skipped from motion estimation;
  if the macroblock may be skipped from motion estimation, checking whether an integer search is set to be performed;
  if the integer search is set to be performed, performing search for the macroblock in a reference frame at integer pixel locations;
  if the intra search is set to be performed, performing intra-frame search for the macroblock; determining whether a selected video encoding standard allows each subblock to have its own decision on whether prediction should be forward or backward;
    if not, find the best macroblock partition in each direction and select the partition direction with smaller distortion;
    if so, merge backward and forward motion vectors for all subblocks and obtain the best macroblock partition based on the merged vectors; and
  determine whether the selected video encoding standard allows each subblock to have its own decision on whether prediction should be unidirectional or bidirectional;
    if not, choose the final direction pattern by comparing bidirectional results for the chosen partition with all subblocks having unidirectional and being bidirectional;
    if so, chose the final direction by comparing bidirectional results for the chosen partition.

23. The article of claim 22, wherein the operations further comprise if a distortion measure between a block in the reference frame and the macroblock is below a predetermined threshold during at least one of the integer search and the skip checking, exiting motion estimation and outputting a final result for the macroblock to a video encoder.

24. The article of claim 22, wherein the operations further comprise:
  calculating distortions for all first dimension pixel subblocks in the macroblock during the integer search;
  deriving distortions for other dimension subblocks in the macroblock; and
  determining macroblock partition that results in the least distortion between the macroblock and its corresponding blocks in the reference frame.

25. The article of claim 22, wherein the operations further comprise fine-tuning results from the integer search by searching the macroblock in the reference frame at fractional pixel positions, if a fractional search is set to be performed.

26. The article of claim 22, wherein the operations further comprise refining prediction directions for the macroblock based on the macroblock partition, if a bidirectional refinement is set to be performed.

* * * * *